(12) United States Patent
Jiang et al.

(10) Patent No.: US 9,067,795 B2
(45) Date of Patent: *Jun. 30, 2015

(54) METHOD FOR MAKING GRAPHENE COMPOSITE STRUCTURE

(75) Inventors: Kai-Li Jiang, Beijing (CN); Xiao-Yang Lin, Beijing (CN); Lin Xiao, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 52 days.

This patent is subject to a terminal disclaimer.

(21) Appl. No.: 13/303,361

(22) Filed: Nov. 23, 2011

(65) Prior Publication Data

US 2012/0298620 A1 Nov. 29, 2012

(30) Foreign Application Priority Data

May 27, 2011 (CN) .......................... 2011 1 0140261

(51) Int. Cl.
| | |
|---|---|
| *C01B 31/04* | (2006.01) |
| *H01B 1/04* | (2006.01) |
| *B82Y 30/00* | (2011.01) |
| *B82Y 40/00* | (2011.01) |

(52) U.S. Cl.
CPC .............. *C01B 31/0453* (2013.01); *H01B 1/04* (2013.01); *B82Y 30/00* (2013.01); *B82Y 40/00* (2013.01)

(58) Field of Classification Search
USPC .......... 530/391.1; 438/694, 409, 20; 429/401, 429/207; 428/688, 408, 403, 366, 336, 428/293.7, 119; 427/554, 331, 256; 423/447.3; 381/164; 361/502; 345/75.2, 179; 324/693; 313/495; 257/9, 659, 40, 500; 250/440.11, 326, 250/311, 201.3; 228/101; 216/36, 33, 20; 156/296, 250, 155
See application file for complete search history.

(56) References Cited

U.S. PATENT DOCUMENTS

| | | | | |
|---|---|---|---|---|
| 6,753,130 | B1 * | 6/2004 | Liu et al. ........................ | 430/313 |
| 7,037,832 | B1 * | 5/2006 | Kuo .............................. | 438/669 |
| 2005/0271574 | A1 | 12/2005 | Jang et al. | |
| 2008/0248235 | A1 | 10/2008 | Feng et al. | |

(Continued)

FOREIGN PATENT DOCUMENTS

| | | |
|---|---|---|
| CN | 101239712 | 8/2008 |
| CN | 101442105 | 5/2009 |

(Continued)

OTHER PUBLICATIONS

Xuesong Li et al. Large-Area Synthesis of high-Quality and Uniform Graphene Films on Copper Foils, Science 324, 2009, pp. 1312-1314.*

(Continued)

*Primary Examiner* — Duy Deo
*Assistant Examiner* — Erin Bergner
(74) *Attorney, Agent, or Firm* — Novak Druce Connolly Bove + Quigg LLP

(57) ABSTRACT

A method for making a graphene composite structure includes providing a metal substrate including a first surface and a second surface opposite to the first surface, growing a graphene film on the first surface of the metal substrate by a CVD method, providing a polymer layer on the graphene film and combining the polymer layer with the graphene film, and forming a plurality of stripped electrodes by etching the metal substrate from the second surface.

20 Claims, 9 Drawing Sheets

(56) References Cited

U.S. PATENT DOCUMENTS

| | | | |
|---|---|---|---|
| 2009/0056854 A1* | 3/2009 | Oh et al. ......................... | 156/60 |
| 2009/0239331 A1* | 9/2009 | Xu et al. ......................... | 438/98 |
| 2009/0268556 A1 | 10/2009 | Jiang et al. | |
| 2009/0291270 A1 | 11/2009 | Zettl et al. | |
| 2011/0017921 A1 | 1/2011 | Jiang et al. | |
| 2011/0123776 A1 | 5/2011 | Shin et al. | |
| 2012/0021224 A1* | 1/2012 | Everett et al. ................. | 428/408 |
| 2012/0192931 A1 | 8/2012 | Jeon et al. | |
| 2012/0251764 A1 | 10/2012 | Jiang et al. | |

FOREIGN PATENT DOCUMENTS

| | | |
|---|---|---|
| CN | 101734650 | 6/2010 |
| CN | 101760724 | 6/2010 |
| CN | 102717537 | 10/2012 |
| JP | 2009-91174 | 4/2009 |
| JP | 2010-52972 | 3/2010 |
| TW | 200833862 | 8/2008 |
| TW | 201103862 | 2/2011 |
| WO | WO2011016616 | 2/2011 |

OTHER PUBLICATIONS

Xuesong Li et al. Supporting online material for Large-Area Synthesis of high-Quality and Uniform Graphene Films on Copper Foils, Science 324, 2009, pp. 1312-1314 Supporting online material pp. 1-3.*

Dingshan Yu et al.; "Self-Assembled Graphene/Carbon Nanotube Hybrid Films for Supercapacitors" The Journal of Physical Chemistry Letters, vol. 1(2010), p. 467-470, Dec. 22, 2009.

Xiaochen Dong et al.; "One-step growth of graphene-carbon nanotube hybrid materials by chemical vapor deposition"; Carbon, vol. 49, p. 2944-2949, Mar. 6, 2011.

* cited by examiner

METHOD FOR MAKING GRAPHENE COMPOSITE STRUCTURE

CROSS-REFERENCE TO RELATED APPLICATIONS

This application claims all benefits accruing under 35 U.S.C. §119 from China Patent Application No. 201110140261.X, filed on May 27, 2011, in the China Intellectual Property Office, the contents of which are hereby incorporated by reference.

BACKGROUND

1. Technical Field

The present disclosure relates to a method for making graphene composite structure.

2. Description of Related Art

Graphene is a carbonaceous material composed of carbon atoms densely packed in a two dimensional honeycomb crystal lattice. Graphene has excellent electrical and thermal properties. An electron mobility of graphene at room temperature is about 15000 $cm^2V^{-1}s^{-1}$. A thermal conductivity of the graphene is about 3000 $Wm^{-1}K^{-1}$. A graphene composite film composed of graphenes has received a great deal of interest because of the specific properties of the graphenes.

The graphene composite film can be created by dispersing graphene in a polymer matrix. In the graphene composite structures, graphene is in the form of fragments, not as a complete layer structure. Thus, the conductivity and ductility of the composite film structure is much lower than the complete graphene layer. In addition, the graphenes are disorderly distributed in the graphene composite film. Thus, light transmittance of the graphene composite film is relatively low.

What is needed, therefore, is to provide a graphene composite structure having excellent conductivity, ductility, and light transmittance.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
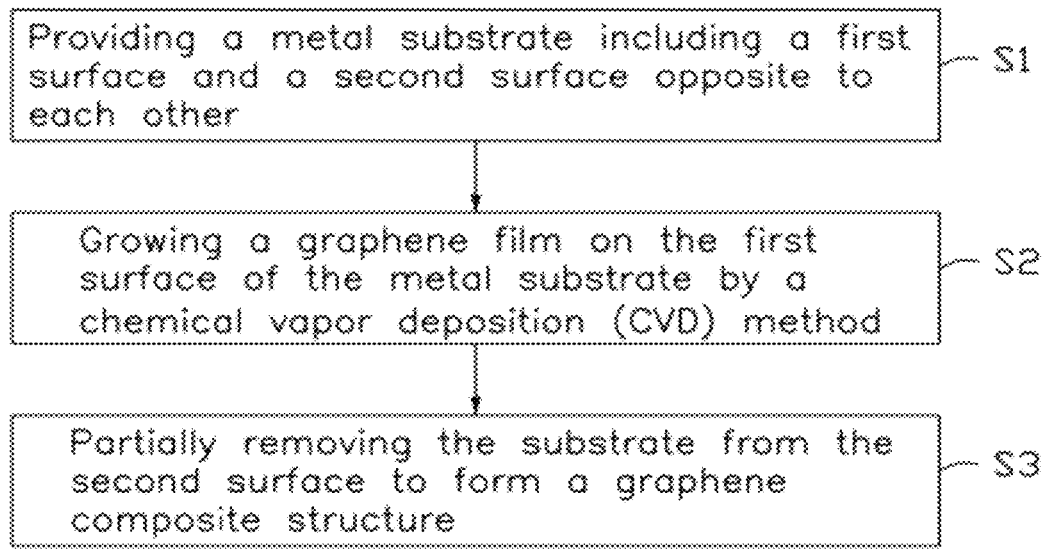
FIG. 1 shows a flowchart of one embodiment of a method for making a graphene composite structure.
Figure 2:
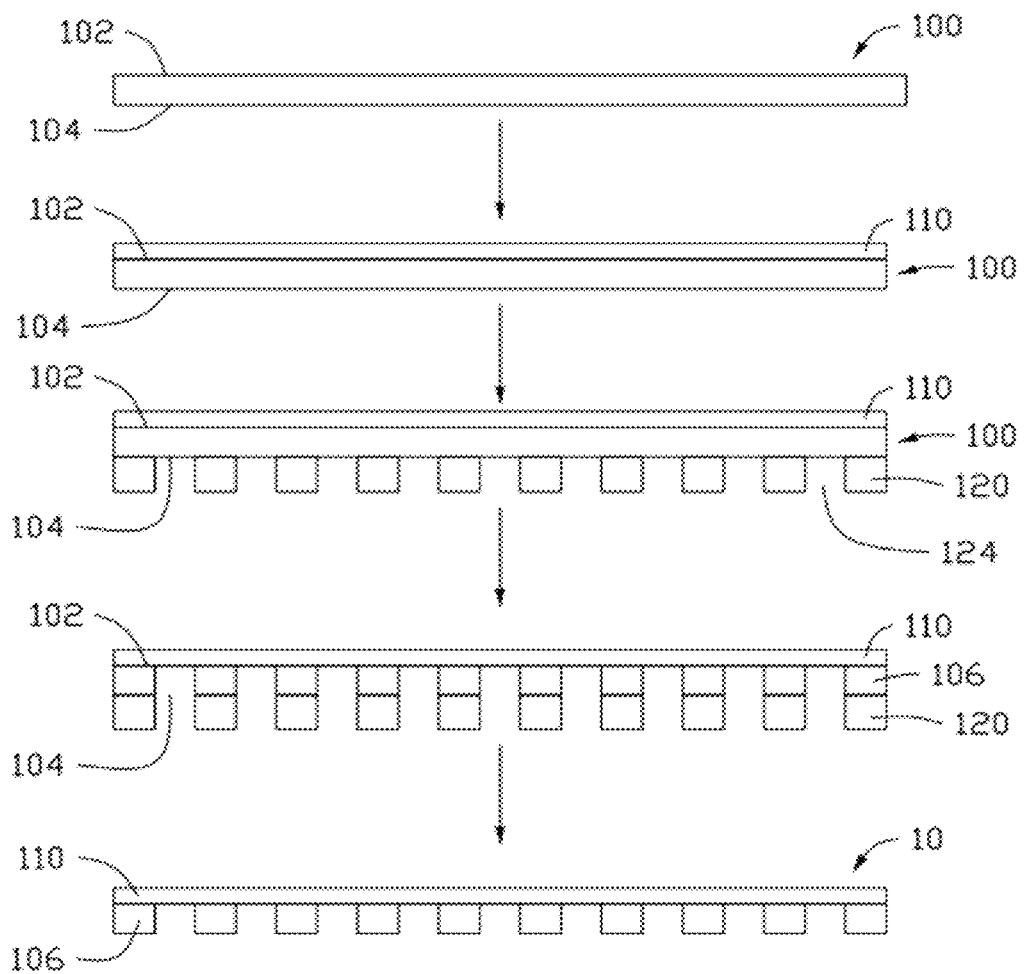
FIG. 2 shows a number of cross-sectional views of the method for making a graphene composite structure in FIG. 1.

Referring to FIG. 1 and FIG. 2, one embodiment of a method for making a graphene composite structure 10 includes:

S1, providing a metal substrate 100 including a first surface 102 and a second surface 104 opposite to each other;

S2, growing a graphene film 110 on the first surface 102 of the metal substrate 100 by a chemical vapor deposition (CVD) method;

S3, partially removing the substrate 100 from the second surface 104 to form a graphene composite structure 10.

In step S1, the metal substrate 100 can be a metal foil with a thickness in a range from about 100 nanometers to about 100 micrometers. A material of the metal substrate 100 can be copper or nickel. A shape of the metal substrate 100 is not limited. An area of the metal substrate 100 can be set according to the volume of the chamber used to grow the graphene film 110 by the CVD method. The metal substrate 100 can be rolled up and put into the chamber to grow the graphene film 110 with a large area. In one embodiment, the metal substrate 100 is a copper foil with a thickness of about 25 micrometers.

Step S2 includes the steps of:

S21, disposing the metal substrate 100 in a reacting chamber;

S22, heating the metal substrate 100 to a predetermined temperature; and

S23, supplying a carbon source gas into the reacting chamber, thereby forming the graphene film 110 on the first surface 102 of the metal substrate 100.

In step S21, the reacting chamber can provide a reaction space for forming the graphene film 110. The reacting chamber can have a sealed cavity. The reacting chamber includes a gas inlet and a gas outlet. The gas inlet is used to input a reaction gas or other resource gas. The gas outlet is connected with an evacuating device. The evacuating device can be used to adjust the pressure in the reacting chamber. Furthermore, the reacting chamber can include a water cooling device to adjust the temperature in the reacting chamber. The reacting chamber can be a quartz tube furnace. An area of the metal substrate 100 can be adjusted according to the volume of the reacting chamber. The metal substrate 100 with a relatively large area can be bent or curved so that it can be placed in the reacting chamber.

In step S22, the first surface 102 of the metal substrate 100 is heated to become more flat. The flatter the first surface 102, the easier to form the graphene film 110 on the first surface 102 of the metal substrate 100. The reacting chamber is evacuated before heating the metal substrate 100. In one embodiment, hydrogen gas can be imported in the reacting chamber through the gas inlet before heating the metal substrate 100. The hydrogen gas can reduce an oxide layer on the first surface 102 of the metal substrate 100, and can further prevent the metal substrate 100 from oxidizing. A flow rate of the hydrogen gas can be in a range from about 2 standard cubic centimeters per minute (sccm) to about 35 sccm. A heating temperature can be in a range from about 800° C. to about 1500° C. A heating period can be in a range from about 20 minutes to about 60 minutes. A pressure in the reacting chamber can be in a range from about 0.1 Pa to about 100 Pa. In one embodiment, the flow rate of the hydrogen gas is about 2 sccm, the pressure of the reacting chamber is about 13.3 Pa, the heating temperature is about 1000° C., the temperature rising period is about 40 minutes, and the constant temperature period at the heating temperature is about 20 minutes.

In step S23, carbon atoms can be deposited on the first surface 102 of the metal substrate 100, thereby forming the graphene film 110 composed of carbon atoms. The hydrogen gas is continuously imported through the gas inlet in step S23 during the process of growing the graphene film 110. The flow rate of the hydrogen gas, during supplying the carbon source gas into the reacting chamber, is the same as that of the step S22. A ratio between the flow rate of the carbon source gas and the hydrogen gas is in a range from about 45:2 to about 15:2. The carbon source gas can be at least one of methane, ethane, ethylene, or acetylene. While supplying the carbon source gas, the temperature in the reacting chamber can be in a range from about 800° C. to about 1500° C. with a constant temperature period in a range from about 10 minutes to about 60 minutes. A pressure in the reacting chamber can be in a range from about $10^{-1}$ Pa to about $10^2$ Pa. In one embodiment, the pressure of the reacting chamber is about 66.5 Pa, the temperature of the reacting chamber is about 1000° C., the flow rate of the carbon source gas is about 25 sccm, the carbon gas is methane, and the constant temperature period is about 30 minutes.

In step S23, the metal substrate 100 can be cooled after forming the graphene film 110 thereon. While cooling the metal substrate 100, the carbon source gas and the hydrogen gas can be continuously flowed into the reacting chamber. The flow rate of the carbon source gas and the hydrogen gas and the pressure of the reacting chamber are constant. In one embodiment, the metal substrate 100 is cooled for about 1 hour. After cooling the metal substrate 100, the metal substrate 100 with the graphene film 110 grown thereon is taken out of the reacting chamber.

Figure 3:
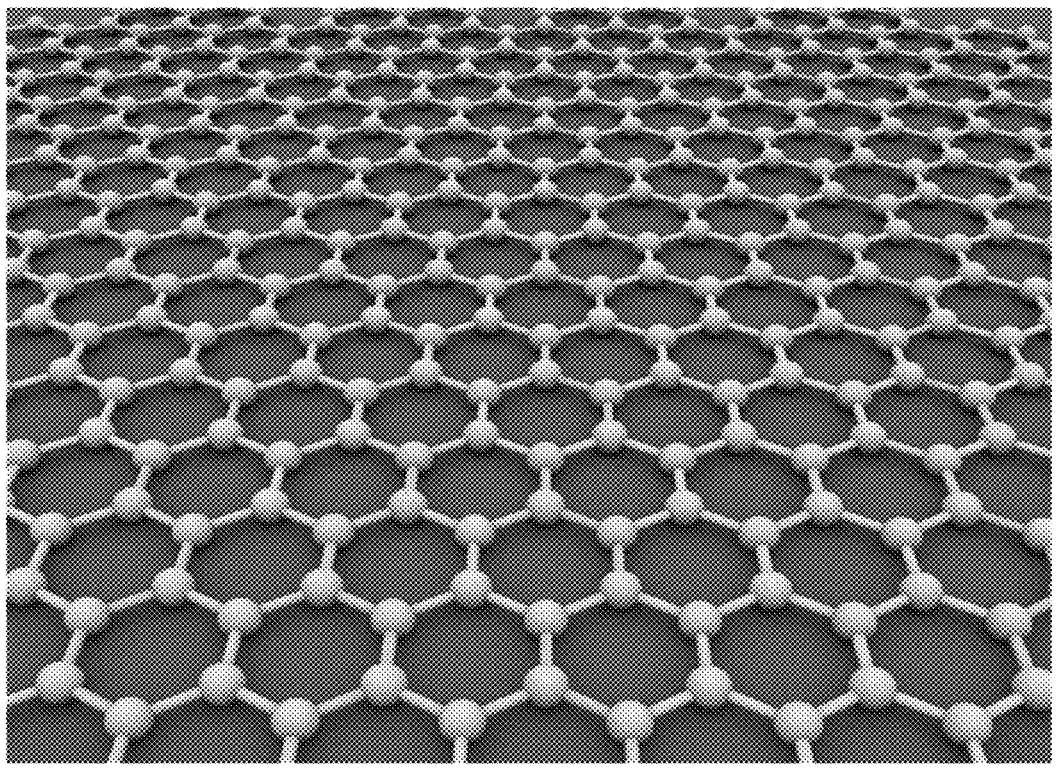
FIG. 3 is a structural view of a graphene.

The graphene film 110 is a two dimensional film structure. A thickness of the graphene film 110 can be in a range from about 0.34 nanometers to about 10 nanometers. The graphene film 110 can include at least one graphene layer. Referring to FIG. 3, the graphene layer is a one-atom thick sheet composed of a plurality of $sp^2$-bonded carbon atoms. If the graphene film 110 includes a plurality of graphene layers, the plurality of graphene layers can overlap each other to form a large area, or stacked with each other to form a large thickness. In one embodiment, the graphene film 110 has a single graphene layer. The graphene layer is a one-atom thick planar sheet composed of a plurality of $sp^2$-bonded carbon atoms. The graphene film 110 having one graphene layer has a high transmittance of 97.7%. A heat capacity of the graphene film 110 can be less than $2 \times 10^{-3}$ J/cm$^2$·K. In one embodiment, the heat capacity of the graphene film 110 having one graphene layer is less than $5.57 \times 10^{-4}$ J/cm$^2$·K. The graphene film 110 can be a free-standing structure. The term "free-standing structure" means that the graphene film 110 can sustain the weight of itself when it is hoisted by a portion thereof without any significant damage to its structural integrity. So, if the graphene film 110 is placed between two separate supports, a portion of the graphene film 110 not in contact with the two supports, would be suspended between the two supports and yet maintain structural integrity.

It is understood that carbon atoms can also be deposited on the second surface 104 of the metal substrate 100, thereby forming another graphene film (not shown in FIG. 2) on the second surface 104. Alternatively, the another graphene film on the second surface 104 can be removed in some embodiments by polishing. Step S23 can further include a step of polishing the second surface 104 of the metal substrate 100, after the graphene film 110 is grown on the first surface 102.

In step S3, the metal substrate 100 can be partially removed by a dry etching technology or wet etching technology. In one embodiment, the metal substrate 100 is partially removed by the dry etching technology, thereby forming a plurality of stripped electrodes 106 spaced from each other. Referring to FIG. 2, the method for dry etching the metal substrate 100 includes:

S31, applying a sacrifice layer 120 on the second surface 104 of the metal substrate 100, wherein the sacrifice layer 120 defines a plurality of spaced sacrifice stripped-grooves 124 to expose the second surface 104 of the partial metal substrate 100;

S32, etching the partial metal substrate 100 exposed from the sacrifice layer 120, thereby forming the plurality of stripped electrodes 106 spaced from each other and exposing a part of the graphene film 110; and S33, removing the sacrifice layer 120.

In step S31, a material of the sacrifice layer 120 can be a polymer, such as thermosetting resin, for example, polymethyl methacrylate, ethoxyline resin, unsaturated polyester, or silicon ether resin.

In step S32, the plurality of stripped electrodes 106 is electrically connected with the graphene film 110. The metal substrate 100 can be etched by the following steps:

disposing the metal substrate 100 with the sacrifice layer 120 in an inductive coupling plasma system;

etching the metal substrate 100 exposed from the sacrifice layer 120 using oxygen and chlorine gas, thereby exposing the graphene film 110.

In one embodiment, a power of the inductive coupling plasma system is about 50 W, a flow rate of the chlorine gas is about 24 sccm, a flow rate of the oxygen is about 24 sccm, a pressure of the inductive coupling plasma system is in a range from about 2 Pa to about 10 Pa, and an etching period is in a range from about 40 seconds to about 55 seconds.

In one embodiment, the metal substrate 100 is etched by wet etching technology, and the material of the metal substrate 100 is copper. Specifically, the metal substrate 100 is etched by immersing the metal substrate 100 in a Ferric trichloride (FeCl$_3$) solution, wherein a concentration of the FeCl$_3$ solution is in a range from about 0.06 mol/L to about 0.25 mol/L, the immersing period is in a range from about 4 minutes to about 15 minutes. The metal substrate 100 uncoated by the sacrifice layer 120 is removed due to a reaction between the metal substrate 100 and the FeCl$_3$ solution.

In step S33, the sacrifice layer 120 can be removed by an organic solvent. The organic solvent can be ethanol, methanol, acetone, dichloroethane, chloroform, or any combination thereof. In one embodiment, the sacrifice layer 120 is removed by acetone.

Figure 4:
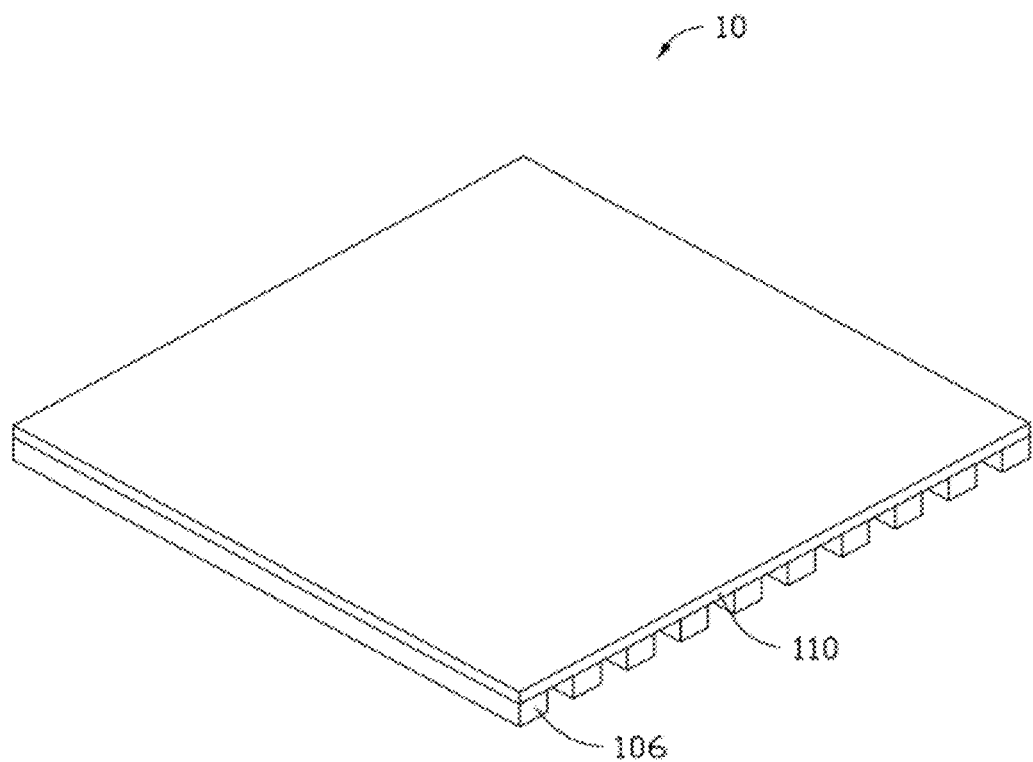
FIG. 4 is a schematic view of the graphene composite structure made by the method of FIG. 1.

Referring to FIG. 4, in one embodiment the graphene composite structure 10 made by the above method includes the graphene film 110, and the plurality of stripped electrodes 106. The graphene film 110 is disposed on the plurality of stripped electrodes 106. The plurality of stripped electrodes 106 can be substantially parallel to each other and electrically connected with the graphene film 110. The plurality of stripped electrodes 106 can support the graphene film 110 and can be used as electrodes in application.

Figure 5:
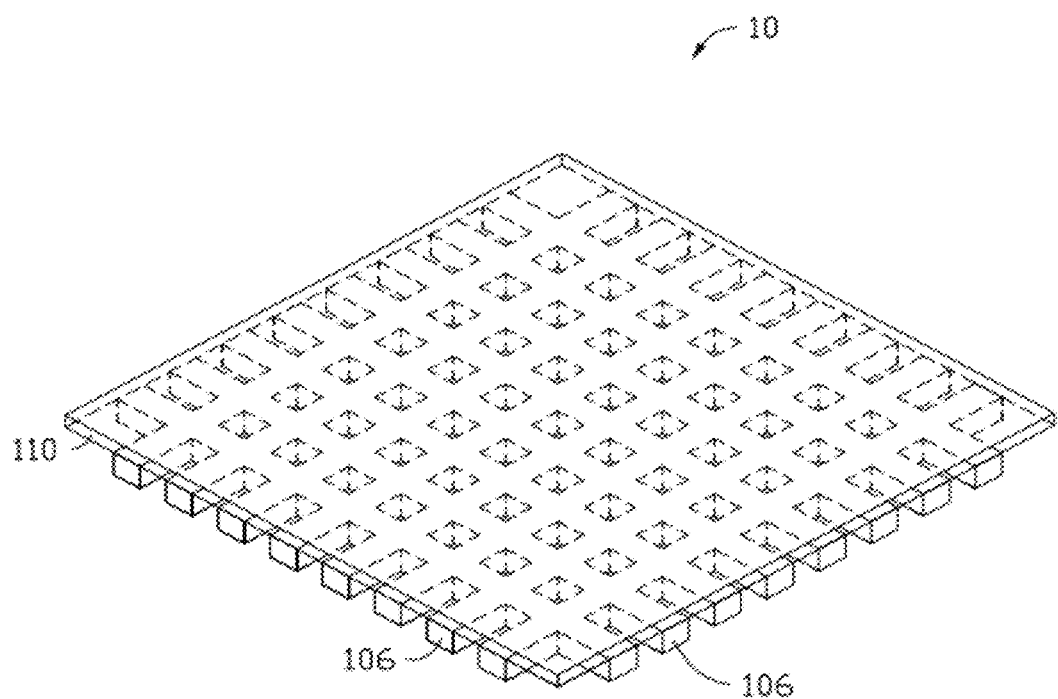
FIG. 5 is a schematic view of the graphene composite structure made by a method of another embodiment.

The metal substrate 100 can be etched into any pattern according to application. Referring to FIG. 5, in one embodiment, the metal substrate 100 is etched into a plurality of stripped electrodes 106 crossed with each other thereby forming a network structure.

Figure 6:
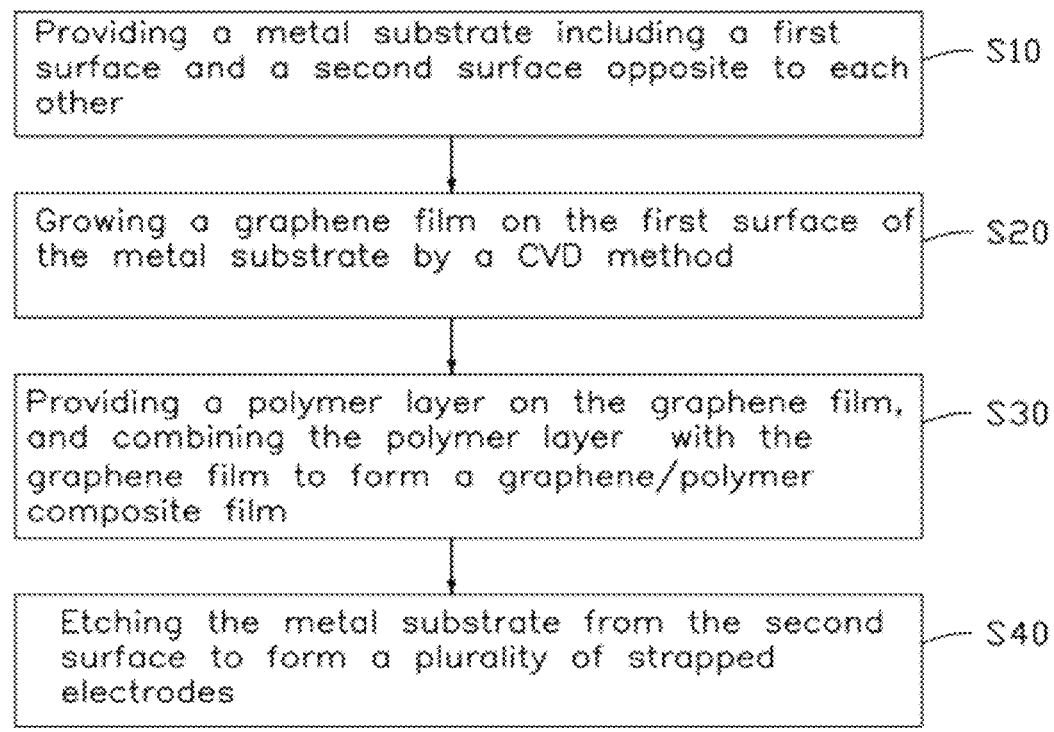
FIG. 6 is a flowchart of another embodiment of a method for making a graphene composite structure.
Figure 7:
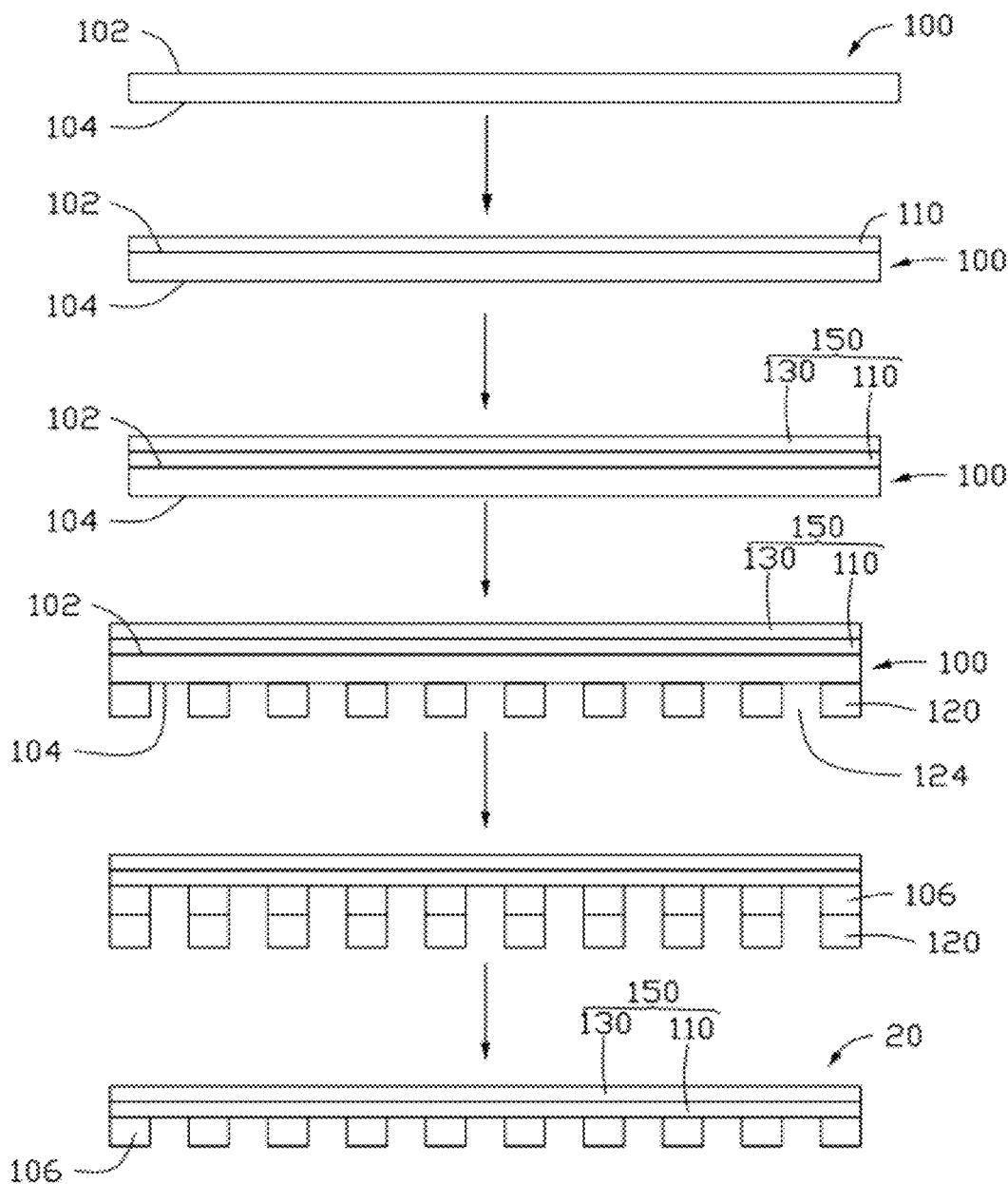
FIG. 7 shows a number of cross-sectional views of the method for making a graphene composite structure in FIG. 6.

Referring to FIG. 6 and FIG. 7, in another one embodiment, a method for making a graphene composite structure 20 includes:

S10, providing a metal substrate 100 including a first surface 102 and a second surface 104 opposite to each other;

S20, growing a graphene film 110 on the first surface 102 of the metal substrate 100 by a CVD method;

S30, providing a polymer layer 130 on the graphene film 110, and combining the polymer layer 130 with the graphene film 110 to form a graphene/polymer composite film 150; and S40, etching the metal substrate 100 from the second surface 104 to form a plurality of stripped electrodes 106.

Steps of S10, S20, and S40 correspond to steps S1, S2, and S3 described above. Referring to FIG. 7, a hot-press device 50 is used in step S30 by a hot-pressing method. The hot-press device 50 is a hot-press machine and includes a heating device (not shown) and a pressing device 52. The heating device is used to heat the pressing device 52. The hot-pressing method in S30 includes the following steps:

S310, placing the metal substrate 100 with the graphene film 110 and the polymer layer 130 in the hot-press device 50;

S320, heating the pressing device 52 of the hot-press device 50; and

S330, pressing the metal substrate 100 with the graphene film 110 and the polymer layer 130 thereon using the pressing device 52.

The polymer layer 130 can be made of a polymer solution or a melted polymer material. The polymer solution can be formed by dissolving a polymer material in an organic solution. The polymer solution has a certain viscosity. In one embodiment, the viscosity of the solution can be greater than 1 Pa·s. The polymer material of the polymer solution and the melted polymer material can be in a solid state at room temperature, and can be transparent. The polymer material can be polystyrene, polyethylene, polycarbonate, PMMA, PC, PET, BCB, or polyalkenamer. The organic solution can be ethanol, methanol, acetone, dichloroethane, or chloroform. In one embodiment, the polymer material is PMMA, and the organic solution is ethanol.

A temperature of the pressing device 52 can range from about 110° C. to about 120° C. In one embodiment, the pressing device 52 includes two rollers. The metal substrate 100 is slowly passed through the two rollers during the pressing process. A speed of the metal substrate 100 is from about 1 millimeter per minute to about 10 meters per minute. In another embodiment, a certain pressure is applied to the metal substrate 100 by the heated roller. As such, the polymer layer 130 is pressed uniformly to adhere the polymer material of the polymer layer 130 with the graphene film 110, thus the polymer layer 130 and the graphene film 110 are combined to form the freestanding graphene/polymer composite film 150.

Figure 8:
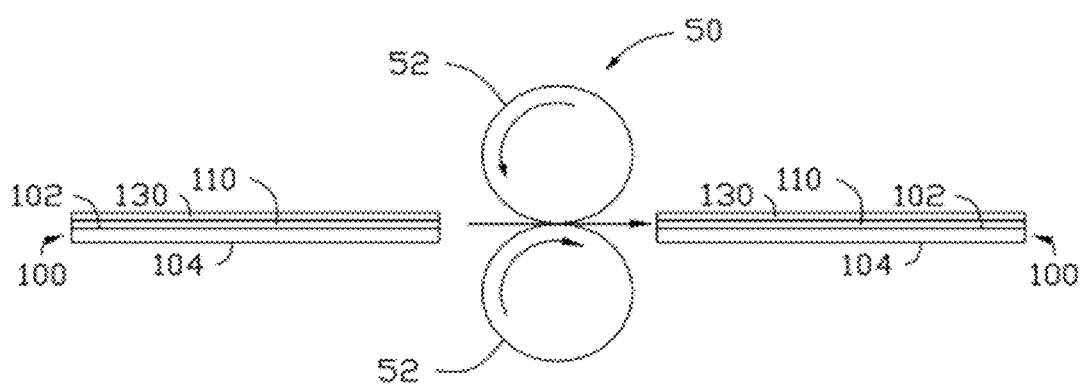
FIG. 8 shows a cross-sectional view of a heat pressing process used in the method of FIG. 6 and FIG. 7.
Figure 9:
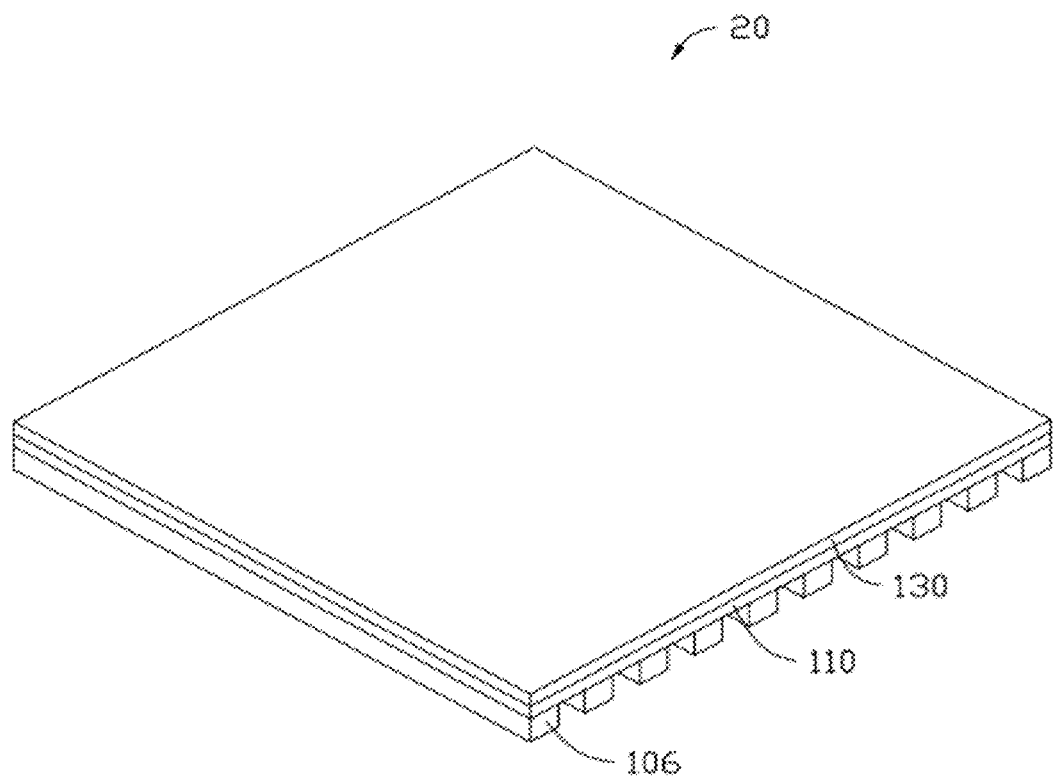
FIG. 9 is a schematic view of the graphene composite structure made by the method of FIG. 6 and FIG. 7.

Referring to FIG. 8, the graphene composite structure 20 includes a polymer layer 130, a graphene film 110, and a plurality of stripped electrodes 106. The graphene film 110 is disposed on the plurality of stripped electrodes 106. The plurality of stripped electrodes 106 can be substantially parallel to each other and electrically connected with the graphene film 110. The graphene film 110 is sandwiched between the polymer layer 130 and the plurality of stripped electrodes 106, and contacts the plurality of stripped electrodes 106. The plurality of stripped electrodes 106 can support the graphene film 110 and the polymer layer 130, and can be used as electrodes in application. The polymer layer 130 covers and protects the graphene film 110.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a graphene composite structure, the method comprising:
    growing a graphene film on a first surface of a metal substrate by a CVD method, wherein the metal substrate has a second surface opposite to the first surface;
    layering a polymer layer on the graphene film, wherein the polymer layer is directly in contact with a surface of the graphene film away from the metal substrate;
    combining the polymer layer with the graphene film while the graphene film remains attached to the metal substrate during the combining process; and
    etching the metal substrate from the second surface to form a plurality of stripped electrodes.

2. The method of claim 1, wherein the metal substrate has a thickness in a range from about 100 nanometers to about 100 micrometers.

3. The method of claim 2, wherein the metal substrate is made of copper or nickel.

4. The method of claim 1, wherein the graphene film is grown on the first surface of the metal substrate by the steps of:
    disposing the metal substrate in a reacting chamber;
    heating the metal substrate to a predetermined temperature; and
    supplying a carbon source gas into the reacting chamber until the graphene film is formed on the first surface of the metal substrate.

5. The method of claim 4, further comprising importing hydrogen gas into the reacting chamber during the process of heating the metal substrate to the predetermined temperature.

6. The method of claim 5, wherein the predetermined temperature is in a range from about 800° C. to about 1500° C.

7. The method of claim 5, further comprising continuously importing the hydrogen gas into the reacting chamber until the graphene film is formed on the first surface of the metal substrate.

8. The method of claim 7, further comprising controlling a ratio between flow rates of the carbon source gas and the hydrogen gas in a range from about 45:2 to about 15:2.

9. The method of claim 8, further comprising cooling the metal substrate after the graphene film is formed, and continuously flowing the carbon source gas and the hydrogen gas into the reacting chamber during the cooling of the metal substrate.

10. The method of claim 1, wherein the polymer layer and the graphene film are combined by a hot-pressing method.

11. The method of claim 10, wherein the polymer layer comprises a material selected from the group consisting of polystyrene, polyethylene, polycarbonate, polymethyl methacrylate (PMMA), polycarbonate (PC), terephthalate (PET), benzo cyclo butene (BCB), and polyalkenamer.

12. The method of claim 1, wherein the step of etching the metal substrate from the second surface to form the plurality of stripped electrodes comprises:
    applying a sacrifice layer on the second surface of the metal substrate , wherein the sacrifice layer defines a plurality of spaced sacrifice stripped grooves to expose the second surface of the metal substrate;

etching the metal substrate exposed from the sacrifice layer, thereby forming the plurality of stripped electrodes spaced from each other and exposing a part of the graphene film; and removing the sacrifice layer.

13. The method of claim 12, wherein the sacrifice layer comprises a material selected from the group consisting of polymethyl methacrylate, ethoxyline resin, unsaturated polyester, and silicon ether resin.

14. The method of claim 12, wherein etching the metal substrate exposed from the sacrifice layer comprises:

disposing the metal substrate with the sacrifice layer in an inductive coupling plasma system; and etching the metal substrate exposed from the sacrifice layer using oxygen and chlorine gas, thereby exposing the graphene film.

15. A method for making a graphene composite structure, the method comprising:

growing a graphene film on a first surface of a metal substrate by a CVD method, wherein the metal substrate has a second surface opposite to the first surface;

combining a polymer layer with the graphene film, wherein the graphene film remains attached on the metal substrate during the combining of the polymer layer with the graphene film, and the polymer layer is directly in contact with the graphene film; and etching the metal substrate from the second surface to form a plurality of stripped electrodes.

16. The method of claim 15, wherein the graphene film is grown on the first surface of the metal substrate by the steps of:

disposing the metal substrate in a reacting chamber;

heating the metal substrate to a predetermined temperature; and supplying a carbon source gas into the reacting chamber until the graphene film is formed on the first surface of the metal substrate.

17. The method of claim 16, further comprising importing hydrogen gas into the reacting chamber during the process of heating the metal substrate to the predetermined temperature.

18. The method of claim 17, wherein the predetermined temperature is in a range from about 800° C. to about 1500° C.

19. The method of claim 17, further comprising continuously importing the hydrogen gas into the reacting chamber until the graphene film is formed on the first surface of the metal substrate.

20. The method of claim 19, further comprising controlling a ratio between flow rates of the carbon source gas and the hydrogen gas in a range from about 45:2 to about 15:2.

* * * * *